United States Patent

Mason

[15] 3,676,805

[45] July 11, 1972

[54] MONOLITHIC CRYSTAL FILTER WITH AUXILIARY FILTER SHORTING TABS

[72] Inventor: Warren Perry Mason, West Orange, N.J.

[73] Assignee: Bell Telephone Laboratories, Incorporated, Murray Hill, Berkeley Heights, N.J.

[22] Filed: Oct. 12, 1970

[21] Appl. No.: 79,880

[52] U.S. Cl. ....................................333/72, 310/8.2, 310/9.4

[51] Int. Cl. ..........................................H03h 7/02, H03h 9/32

[58] Field of Search .........................333/72; 310/8.2, 9.4, 9.8

[56] References Cited

UNITED STATES PATENTS

| | | | |
|---|---|---|---|
| 3,585,537 | 6/1971 | Rennick et al. | 333/72 |
| 3,569,873 | 3/1971 | Beaver | 333/72 |
| 3,582,836 | 6/1971 | Kent | 333/72 |
| 3,573,672 | 4/1971 | Fair | 333/72 |
| 3,437,848 | 4/1969 | Borner | 310/8.2 |
| 3,576,506 | 4/1971 | Reynolds | 333/72 |
| 3,518,573 | 6/1971 | Smith | 333/72 |

*Primary Examiner*—Paul L. Gensler
*Attorney*—R. J. Guenther and Edwin B. Cave

[57] ABSTRACT

Energy loss in the short-circuiting tabs of the interior resonators of monolithic crystal filters is reduced by constructing the tabs in the form of auxiliary trapped energy filters having a passband with a center frequency that differs from the center frequency of the passband of the primary filter. The tabs or auxiliary filters act as reflectors that direct the energy that otherwise would be dissipated back into the trapped energy region of the main electrodes, thus enhancing overall filter efficiency.

10 Claims, 7 Drawing Figures

PRIOR ART FIG. 1
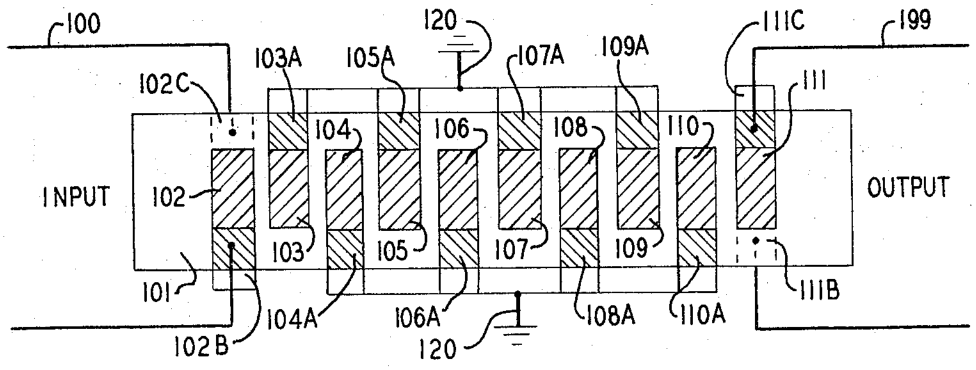
FIG. 2
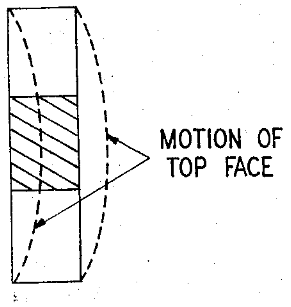
FIG. 3
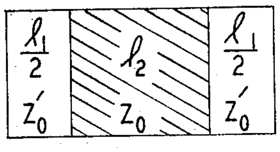
FIG. 6
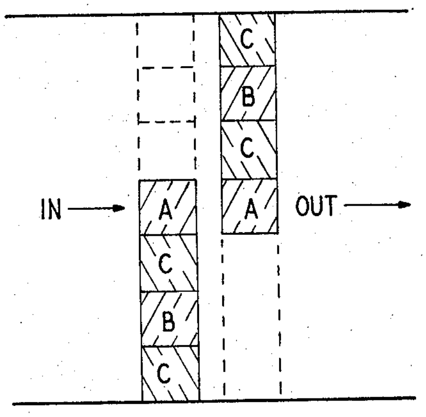
FIG. 7
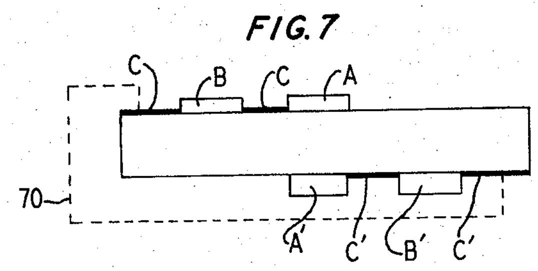
INVENTOR
W. P. MASON
BY E. J. Shinder
ATTORNEY

MONOLITHIC CRYSTAL FILTER WITH AUXILIARY FILTER SHORTING TABS

BACKGROUND OF THE INVENTION

1. Field of the Invention

This invention relates to monolithic crystal filters and more particularly to filters of that type employing one or more short-circuited pairs of electrodes between the input and output electrode pairs.

2. Description of the Prior Art

Monolithic crystal filters are now well known in the filter art and are described, for example, by W. D. Beaver and R. A. Sykes in their application, Ser. No. 558,338, filed June 17, 1966, now U.S. Pat. No. 3,564,463. In the simplest type of monolithic crystal filter, the filter structure is formed by sandwiching a piezoelectric wafer between one pair of electrodes that serves as an input and between another pair of electrodes, spaced from the first pair, that serves as an output. By means of a particular size, density and position relation between any electrode pair and its corresponding wafer section, such a combination or section being termed a resonator, a condition defined as mass loading is established. Mass loading is evidenced primarily by the phenomenon that acoustic energy supplied in or near to any one of the resonators is essentially confined or trapped within the boundaries of that resonator so that very little escapes to the surrounding piezoelectric body. Moreover, as a result of a substantial difference between the resonant frequency of the resonators and the resonant frequency of the unloaded portion of the piezoelectric body, the relatively limited amount of acoustic energy that in effect does escape from the trapping zone of the resonator decreases exponentially in magnitude as the distance from the resonator increases. Consequently, the contour and dimensions of the outer perimeter of the piezoelectric body surrounding a resonator characterized by mass loading have virtually no effect on the nature of the energy translation achieved by the device.

By means of a particular size, position and distance relation between adjacent resonators, which relation is defined as acoustic coupling, each electrode pair in a monolithic crystal filter is positioned within the acoustic field of each adjacent pair. Moreover, the only physical path between the input and output resonators is in the piezoelectric body and substantially all of the energy transferred from one resonator to the other is acoustic energy.

As a result of combining the phenomena associated with mass loading and acoustic coupling to form a monolithic crystal filter as taught by Beaver and Sykes, the image impedance of the structure or circuit as a whole is found to conform to a specifically defined pattern. Further, the structure or circuit as a whole may be identified by an equivalent circuit in the form of a lattice, the resonant and antiresonant frequencies of which are characterized by a specifically defined relation. The "defined pattern" and the "defined relation" referred to immediately above are set forth in detail by Beaver and Sykes in the cited application. Characteristics of such filters as compared to earlier multisection crystal filters include smaller size, lower cost, enhanced simplicity and greater flexibility in shaping the passband. It is to be understood that the term "monolithic crystal filter" as used herein refers to the monolithic crystal filter as described in general above and as taught specifically by Beaver and Sykes.

One important improvement in monolithic crystal filters which affords enhanced precision and flexibility in shaping the passband characteristics is shown by R. L. Reynolds and R. A. Sykes in application, Ser. No. 723,676, filed Apr. 24, 1968, now U.S. Pat. No. 3,576,506. The improvement involves the use of one or more intermediate electrode pairs positioned between the input and output resonators, and it has been found that particularly advantageous results are achieved in some filter arrangements when the intermediate electrode pairs are shorted together by means of a tab or other suitable conducting means, each of the tabs then being grounded.

Despite the generally desirable results achieved with monolithic crystal filters employing intermediate electrode pairs and short-circuiting tabs, it has been found that this added structure can usually be employed only with a substantial loss in filter efficiency. Specifically, one of the principal problems in the construction of filters of the type described by Reynolds and Sykes is to maintain a Q in the order of 300,000 or more so as to avoid rounding off the edges of the filter passband. At a frequency of 10 megahertz, the Q of the piezoelectric quartz crystal itself has a value on the order of 1,500,000, and thus it is evident that the lowering of the Q is connected with energy dissipation in the plating or in the loss of energy from the trapped energy region through various modes of motion or through the short-circuiting tabs.

Accordingly, a broad object of this invention is to enhance the efficiency of monolithic crystal filters.

SUMMARY OF THE INVENTION

The principles of the invention are based in part on the discovery that a substantial portion of the energy loss experienced in prior art monolithic crystal filters occurs in the short-circuiting tabs of interior resonators. This discovery came to light first as the result of theoretical studies and has since been confirmed by X-ray measurements. In accordance with the invention, the energy loss indicated is largely avoided by constructing each short-circuiting tab in the form of an auxiliary trapped energy filter with a passband at a different frequency than that of the main filter. Consequently, the auxiliary or tab filter acts as a reflector which reflects virtually all of the energy back into the trapped energy region of the corresponding main resonator. The result is a substantially larger Q for the entire filter.

The conventional monolithic crystal filter is of the thickness-shear type. In accordance with a particular feature of the invention, however, the auxiliary or tab filters are of the thickness-twist type.

In accordance with another feature of the invention, the tab filters are formed from a composite of different mass loaded regions, the relatively heavy or thick portions being determined by the requirements of mass loading and the relatively light or thin portions being determined by the requirements of conduction.

BRIEF DESCRIPTION OF THE DRAWING

FIG. 1 is a sketch of a monolithic crystal filter in accordance with the prior art;

FIG. 2 is a sketch illustrating the mode of motion of the crystal face;

FIG. 3 is a sketch illustrating a midshunt arrangement for a monolithic crystal filter section in accordance with the invention;

FIG. 6 is a sketch of a tab filter in accordance with the invention; and

FIG. 7 is a cross section of the filter shown in FIG. 6 taken along the line 6—6.

DETAILED DESCRIPTION

Figure 4:
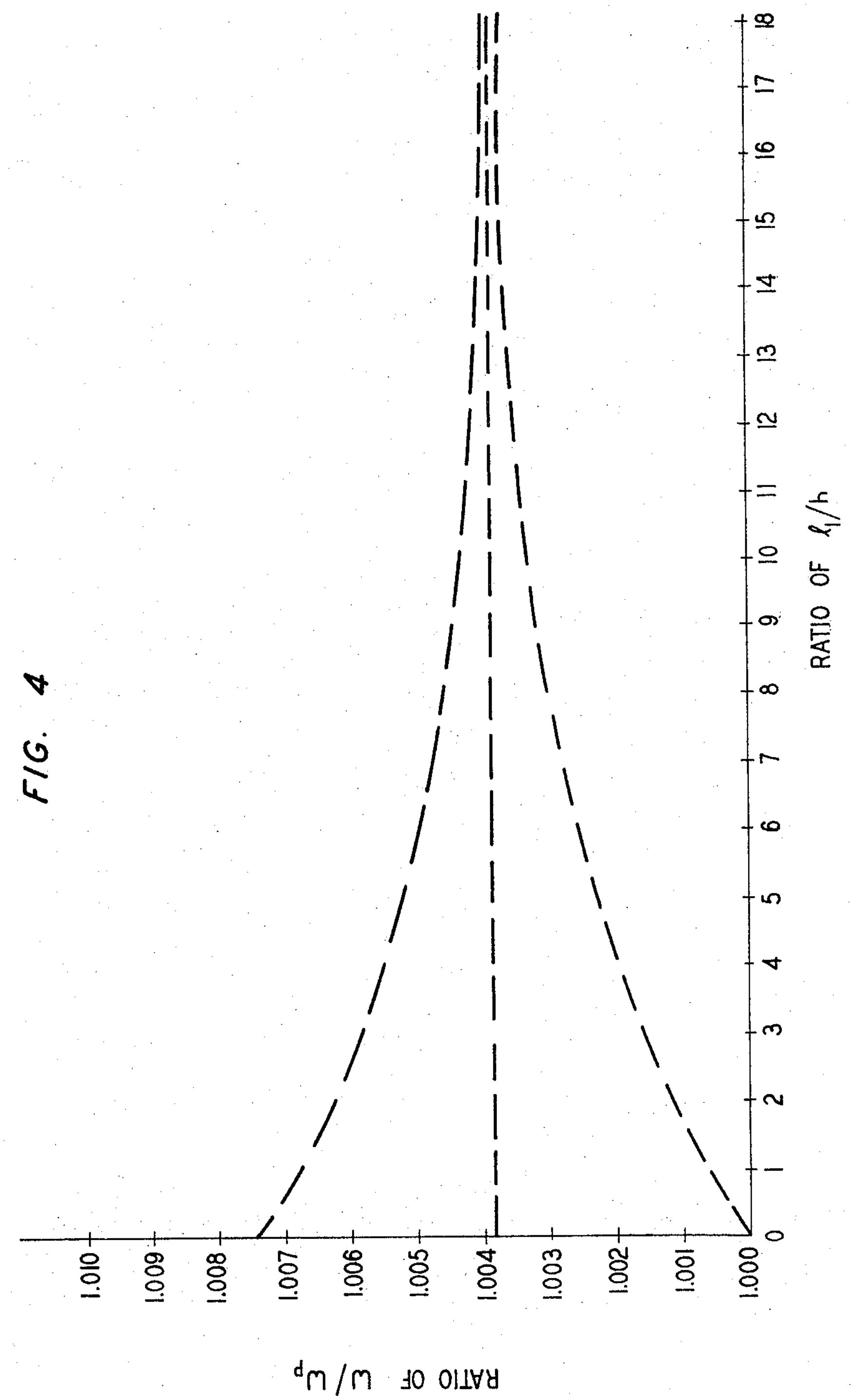
FIG. 4 is a plot of upper and lower cutoff values for a thickness-twist filter plotted as a ratio of $l_{1h}$.

The prior art monolithic crystal filter shown in FIG. 1 is formed from a piezoelectric crystal body or wafer 101 sandwiched between a total of 10 pairs of electrodes, one electrode 102 through 111 in each pair being shown. In each case, the opposing electrode which is on the hidden side of the filter is in alignment with its corresponding electrode on the side illustrated. Resonators formed by the electrodes 102 and 111, respectively, are the input and output resonators; 102B and 102C are connecting input tabs, and 111B and 111C are connecting output tabs. Each of the electrodes 103 through 110 is shorted to its corresponding mating electrode (not shown) by a respective one of the connecting tabs 103A through 110A. The shorttcircuiting tabs 103A through 110A may be in the form of thin evaporated films which are at right angles to the propagation direction. These films loop over the edge of the piezoelectric body 101 and are connected to similar tabs, not shown, on the bottom. An alternative approach to shorting tab design in the prior art is to employ tabs which make contact with their respective electrodes only when the filter is placed in position for operation. In this way, the filter resonators remain unshorted until actual use, which facilitates final resonator measurements and adjustments. Also as shown in FIG. 1, each of the shorting tabs 103A through 110A is connected to a grounding strap 120.

A monolithic crystal filter of the type shown in FIG. 1 is typically shorting thickness-shear filter, and if all of the energy in the filter were in the form of straight crested shear waves, it is evident that the shorting tabs 103A through 110A would not conduct any energy away. As illustrated in FIG. 2, however, straight crested waves cannot be the mode of motion at the edge of a crystal plate since beyond the plating there is no force to produce the shear wave. The boundary condition thus requires that a thickness-twist mode shall be propagated in the unplated section of a filter in a direction perpendicular to the direction of shear wave propagation, since it is evident that the shorting tabs can conduct energy away from the main filter or resonator region with a consequent reduction in the Q of each resonator. In accordance with the invention, however, by designing each of the shoring tabs 103A through 110A in the form of a thickness-twist filter with a different passband than the main filter, all the tab energy can be reflected back into the main resonator, the Q in each case being substantially increased.

To facilitate the design of a thickness-twist filter in the environment indicated, as well as to ensure a full understanding of the principles involved, requires an examination of certain underlying theoretical considerations. It can be shown that the equation of motion of a thickness-twist wave is $$\gamma_{55}^{D}\frac{\partial^2\psi}{\partial z^2}-\frac{3}{h^2}k^2c_{66}^{D}\psi=\rho\ddot{\psi}, \qquad (1)$$

where $$\gamma_{55}^{D}=c_{55}^{D}-(c_{56}^{D})^2/c_{66}^{D};$$

i.e., Voight's face-shear constant, $\psi$ is the rotation about the $z$ axis of a line element initially normal to the middle plane, $k^2=\pi^2/12$, $c_{66}^{D}$ is the shear elastic modulus at constant electric displacement, $h$ is half the thickness of the plate and $\rho$ is the density of the crystal. The boundary conditions that must be satisfied $z=\pm c$ are that $M_5$, the twisting couple, must be continuous across the boundary as does also the rotation $\psi$. The twisting couple is given in terms of the rotation, if the rotation and couple have the same sense, by $$M_5=-\frac{2}{3}h^3\gamma_{55}^{D}\frac{\partial\psi}{\partial z}. \qquad (2)$$

For the plated portion, one must consider the added mass from the plating and use the short-circuited elastic constants $c_{66}^{E}$ and $\gamma_{55}^{E}$. For quartz, there is little difference, but for highly coupled crystals the difference may be large. These differences result in the following equation of motion:

$$\gamma_{55}^{E}\frac{\partial^2\bar{\psi}}{\partial z^2}-\frac{3}{h^2}\bar{k}^2c_{66}^{E}\bar{\psi}=\rho(1+3R)\frac{\partial^2\bar{\psi}}{\partial t^2}, \qquad (3)$$

where $R$ is the ratio of the added mass due to the plating and to the mass of the unplated crystal, $$\bar{k}^2=\frac{(1+3R)}{(1+R)^2}\frac{\pi}{12},$$

and $\bar{\psi}$ is the rotation in the plated section. The moment $M_5$ is given by equation (2) with $\gamma_{55}^{D}$ replaced by $\gamma_{55}^{E}$. The boundary conditions between the plated and unplated sections are $$\bar{M}_5=M_5;\ \bar{\psi}=\psi. \qquad (4)$$

A solution of equation (1) for the unplated section can be written in the form $$\psi=A\cosh\eta z+B\sinh\eta z \qquad (5)$$

where $A$ and $B$ are constants. Substituting this equation in equation (1), it is seen to be a solution if $$\eta^2=\frac{3}{h^2}\frac{k^2c_{66}^{D}}{\gamma_{55}^{D}}-\frac{\omega^2\rho}{\gamma_{55}^{D}}=\frac{3}{h^2}\frac{k^2c_{66}^{D}}{\gamma_{55}^{D}}\left[1-\frac{\omega^2}{\omega_c^2}\right],$$

where $$\omega_c=\frac{\pi}{2h}\sqrt{\frac{c_{66}^{D}}{\rho}}. \qquad (6)$$

Inserting the value of $k^2$ and taking the square root results in the following:

$$\eta=\frac{\pi}{2h}\sqrt{\frac{c_{66}^{D}}{\gamma_{55}^{D}}}\sqrt{1-\frac{\omega^2}{\omega_c^2}}. \qquad (7)$$

Inserting the value of $\psi$ from equation (5) into equation (2), the expression for the moment, we have $$M_5=-\frac{2}{3}h^3\gamma_{55}^{D}\frac{\partial\psi}{\partial z}=-\frac{2}{3}h^3\gamma_{55}^{D}\eta\,[A\sinh\eta z+B\cosh\eta z]. \qquad (8)$$

The expression for $\psi$ or $\dot{\psi}=j\omega\psi$, which is usually used to determine impedance values, and the expression for $M_5$ can be used to determine the values of $A$ and $B$. When $z=0$, then, $$A=\psi_0=\frac{\dot{\psi}_0}{j\omega};\ B=-M_{5_0}\Big/\frac{2}{3}h^3\gamma_{55}^{D}\eta. \qquad (9)$$

Inserting these values in equation (5) and in equation (8) and dropping the subscript 5, which is not needed, these two equations may be written in the following form:

$$\dot{\psi}=\dot{\psi}_0\cosh\eta z+(M_0/Z_0')\sinh\eta z;\ M=M_0\cosh\eta z+\dot{\psi}_0Z_0'\sinh\eta z \qquad (10)$$

where $Z_0'$ is $$Z_0'=j\left[\frac{2}{3}\frac{h^3\gamma_{55}^{D}\eta}{\omega}\right]=j\left[\frac{2}{3}h^3\sqrt{\gamma_{55}^{D}\rho}\sqrt{\frac{\omega_c^2}{\omega^2}-1}\right]. \qquad (11)$$

The solution for the plated section as shown in equation (3) may be written in the following form:

$$\bar{\psi}=A\cos\epsilon z+B\sin\epsilon z \qquad (12)$$

Substituting this equation in equation (3), it is seen to be a solution if $$\xi^2=\frac{\omega^2\rho(1+3R)}{\gamma_{55}}-\frac{3}{h^2}\frac{\bar{k}^2c_{66}^{E}}{\gamma_{55}^{E}}=\frac{3\bar{k}^2c_{66}^{E}}{h^2\gamma_{55}^{E}}\left[\frac{\omega^2}{\omega_p^2}-1\right], \qquad (13)$$

where $$\omega_p^2=\frac{3\bar{k}^2c_{66}^{E}}{(1+3R)\rho h^2}=\frac{\pi^2}{4h^2}\frac{c_{66}^{E}}{(1+R)^2\rho}\ \text{or}\ \omega_p=\frac{\pi}{2h(1+R)}\sqrt{\frac{c_{66}^{E}}{\rho}}. \qquad (14)$$

The constants $\bar{A}$ and $\bar{B}$ can be evaluated as before, and the two equations corresponding to equation (10) become $$\dot{\bar{\psi}}=\dot{\bar{\psi}}_0\cos\xi z-j\frac{M_0}{Z_0}\sin\xi z;\ M=M_0\cos\xi z-j\dot{\bar{\psi}}_0Z_0\sin\xi z, \qquad (15)$$

where $$Z_0=\frac{2}{3}h^3\sqrt{(1+3R)\gamma_{55}^{E}\rho}\sqrt{1-\left(\frac{\omega_p}{\omega}\right)^2}. \qquad (16)$$

By combining plating sections of length $l_2$ with unplated sections of length $l_1$, as shown in FIG. 3, it is known that monolithic crystal filter sections may be constructed for straight crested shear waves. The typical section, as shown in FIG. 3, consists of a half length $l$ of unplated crystal on each end of a plated section of $l_2$. The equations of importance insofar as this analysis is concerned are those in which $z=0$ and which occur at the initial edge of the unplated and plated sections. The following family of equations are pertinent:

$$M_2=M_1 \cosh\frac{\eta l_1}{2}+\dot{\psi}_1 Z_0' \sinh\frac{\eta l_1}{2};$$

1st half section $$\dot{\psi}_2=\dot{\psi}_1 \cosh\frac{\eta l_1}{2}+\frac{M_1}{Z_0'} \sinh\frac{\eta l_1}{2};$$

$$M_3=M_2 \cos\xi l_2-j\dot{\psi}_2 Z_0 \sin\xi l_2;$$

plated section (17)

$$\dot{\psi}_3=\dot{\psi}_2 \cos\xi l_2-\frac{jM_2}{Z_0}\sin\xi l_2;$$

For this case, $A=C$ and the filter is a symmetrical filter with $Z_{I_1}=Z_{I_2}$. To obtain the expression for the propagation constant and for the image impedance, it is necessary to insert the values of the ratios $Z_0/Z_0'$ and $Z_0'/Z_0$. From equations (11) and (16), these ratios are as follows:

$$\frac{Z_0}{Z_0'}=\frac{\frac{2}{3}h^3\sqrt{(1+3R)\gamma_{55}^E\rho}\,\sqrt{1-\omega^2/\omega_p^2}}{j\frac{2}{3}h^3\sqrt{\gamma_{55}^D\rho}\,\sqrt{(\omega_c/\omega)^2-1}}$$

$$=-j\sqrt{\frac{(1+3R)\gamma_{55}^E c_{66}^E}{(1+R)^2 c_{66}^D\gamma_{55}^D}}\sqrt{\frac{(\omega/\omega_p)^2-1}{1-(\omega/\omega_c)^2}} \qquad (21)$$

when we use the variables of $\xi$ and $\eta$. The quantity $$\alpha=\sqrt{\frac{(1+3R)\gamma_{55}^E c_{66}^E}{(1+R)^2 c_{66}^D\gamma_{55}^D}} \qquad (22)$$

is a small quantity usually close to unity in value when account is taken of the ratio $\gamma_{55}^E c_{66}^E/\gamma_{55}^D c_{66}^D$. The value of $Z_0'/Z_0$ is the inverse of equation (21). Accordingly, the expressions for the propagation constant and for the image impedance are as follows:

$$\cosh\Gamma=\cos\xi l_2\cosh\eta l_1+\frac{1}{2}\left[\frac{1}{\alpha}\sqrt{\frac{1-(\omega/\omega_c)^2}{(\omega/\omega_p)^2-1}}-\alpha\sqrt{\frac{(\omega/\omega_p)^2-1}{1-(\omega/\omega_c)^2}}\right]\sinh\eta l_1\sin\xi l_2 \qquad (23)$$

$$Z_I=\frac{j\frac{2}{3}h^3\sqrt{\gamma_{55}^D\rho}\,\sqrt{1-(\omega/\omega_c)^2}}{(\omega/\omega_c)}\sqrt{\frac{\sinh\eta l_1\cos\xi l_2-\sin\xi l_2\left[\alpha\sqrt{\frac{(\omega/\omega_p)^2-1}{1-(\omega/\omega_c)^2}}\cosh^2\frac{\eta l_1}{2}-\frac{1}{\alpha}\sqrt{\frac{1-(\omega/\omega_c)^2}{(\omega/\omega_p)^2-1}}\sinh^2\frac{\eta l_1}{2}\right]}{\sinh\eta l_1\cos\xi l_2+\sin\xi l_2\left[\frac{1}{\alpha}\sqrt{\frac{1-(\omega/\omega_c)^2}{(\omega/\omega_p)^2-1}}\cosh^2\frac{\eta l_1}{2}-\alpha\sqrt{\frac{(\omega/\omega_p)^2-1}{1-(\omega/\omega_c)^2}}\sinh^2\frac{\eta l_1}{2}\right]}}$$

$$M_4=M_3 \cosh\frac{\eta l_1}{2}+\dot{\psi}_3 Z_0' \sinh\frac{\eta l_1}{2};$$

last half section $$\dot{\psi}_4=\dot{\psi}_3 \cosh\frac{\eta l_1}{2}+\frac{M_3}{Z_0'}\sinh\frac{\eta l_1}{2}.$$

By combining the expressions making up Equation (17), it is readily shown that the output variables are given in terms of the input variables by the following equations:

$$M_4=M_1\left[\cos\xi l_2\cosh\eta l_1-\frac{j}{2}\left[\frac{Z_0}{Z_0'}+\frac{Z_0'}{Z_0}\right]\sinh\eta l_1\sin\xi l_2\right]$$
$$+\psi_1 Z_0'\left[\sinh\eta l_1\cos\xi l_2-j\sin\xi l_2\left[\left(\frac{Z_0}{Z_0'}\cosh^2\frac{\eta l_1}{2}+\frac{Z_0'}{Z_0}\sinh^2\frac{\eta l_1}{2}\right)\right]\right.$$

$$\psi_4=\psi_1\left[\cos\xi l_2\cosh\eta l_1-\frac{j}{2}\left[\frac{Z_0}{Z_0'}+\frac{Z_0'}{Z_0}\right]\sinh\eta l_1\sin\xi l_2\right]$$
$$+\frac{M_1}{Z_0'}\left[\sinh\eta l_1\cos\xi l_2-j\sin\xi l_2\left[\left(\frac{Z_0'}{Z_0}\cosh^2\frac{\eta l_1}{2}+\frac{Z_0}{Z_0'}\sinh^2\frac{\eta l_1}{2}\right)\right]\right]. \qquad (18)$$

$Z_{I_1}$, $Z_{I_2}$

It is well known, as illustrated by the text entitled *Electromechanical Transducers and Wave Filters*, by W. P. Mason, D. Van Nostrand Co., Inc., New York, N.Y., 1942, page 22, that if the output variables are given in terms of the input variables by the following equations $$E_0=E_I A-i_I 2B;\ i_0=i_I C-E_I D \qquad (19)$$

then the network can be represented as a transforming filter with the input impedance $Z_I$, the output image impedance $Z_I$ and the propagation constant $\Gamma$ being given by the following equations:

$$Z_{I_1}=\sqrt{\frac{BC}{AD}};\ Z_{I_2}=\sqrt{\frac{AB}{CD}};\ \cosh\Gamma=\sqrt{AC}. \qquad (20)$$

The following calculations will serve to illustrate the use to which certain of the foregoing equations may be put when designing a filter in accordance with the invention. First, we assume that $$R=0.02;\ l_2/h=25.0 \text{ i.e., } (l_2/2h)=12.5 \qquad (24)$$

$$\eta=\frac{kl_1}{h}\sqrt{1-(\omega/\omega_c)^2} \text{ and } \xi=\frac{\bar{k}l_2}{h}\sqrt{(\omega/\omega_p)^2-1}, \qquad (25)$$

the values of $k$ and $\bar{k}$ are, respectively, 1.02 and 1.03. When $l_1=0$, the lower and upper cutoffs are, respectively, $$\text{l.c.}; \omega/\omega_p=1;\ \text{u.c.}: \cos\frac{\bar{k}l_2}{h}\sqrt{(\omega/\omega_p)^2-1}$$

$$=-1 \text{ or } \frac{\omega}{\omega_p}=\sqrt{1+\left(\frac{\pi h}{\bar{k}l_2}\right)^2}=1.00745 \qquad (26)$$

For $l_1/h=10$ the solutions are $$(\omega/\omega_p)=1.00335 \text{ (1.c.)};\ \omega/\omega_p=1.0043 \text{ (u.c.)} \qquad (27)$$

For $l_1/h=\infty$ the solution is given by $$0=\cos\xi l_2+\frac{1}{2}\left[\frac{1}{\alpha}\sqrt{\frac{1-(\omega/\omega_c)^2}{(\omega/\omega_p)^2-1}}-\alpha\sqrt{\frac{(\omega/\omega_p)^2-1}{1-(\omega/\omega_c)^2}}\right]\sin\xi l_2$$

or $$\tan\xi l_2=-\frac{2}{\left[\frac{1}{\alpha}\sqrt{\frac{1-(\omega/\omega_c)^2}{(\omega/\omega_p)^2-1}}-\alpha\sqrt{\frac{(\omega/\omega_p)^2-1}{1-(\omega/\omega_c)^2}}\right]} \qquad (28)$$

This has the solution $$(\omega/\omega_p)=1.00382 \qquad (29)$$

which is half-way between the two solutions shown by equation (27). An approximate curve from these three solutions is shown in FIG. 4. The value of $\omega/\omega_p$ given by equation (29) is also the resonant frequency of a plated crystal of the ratio $l_2/h=25.0$, surrounded by an unplated crystal. The second solution of equation (28) gives the second trapped energy band. For the present case, this energy band is in effect inside the trapped energy region, but by making the length $l_2/h$ smaller, a single trapped energy filter band can be obtained.

Figure 5:
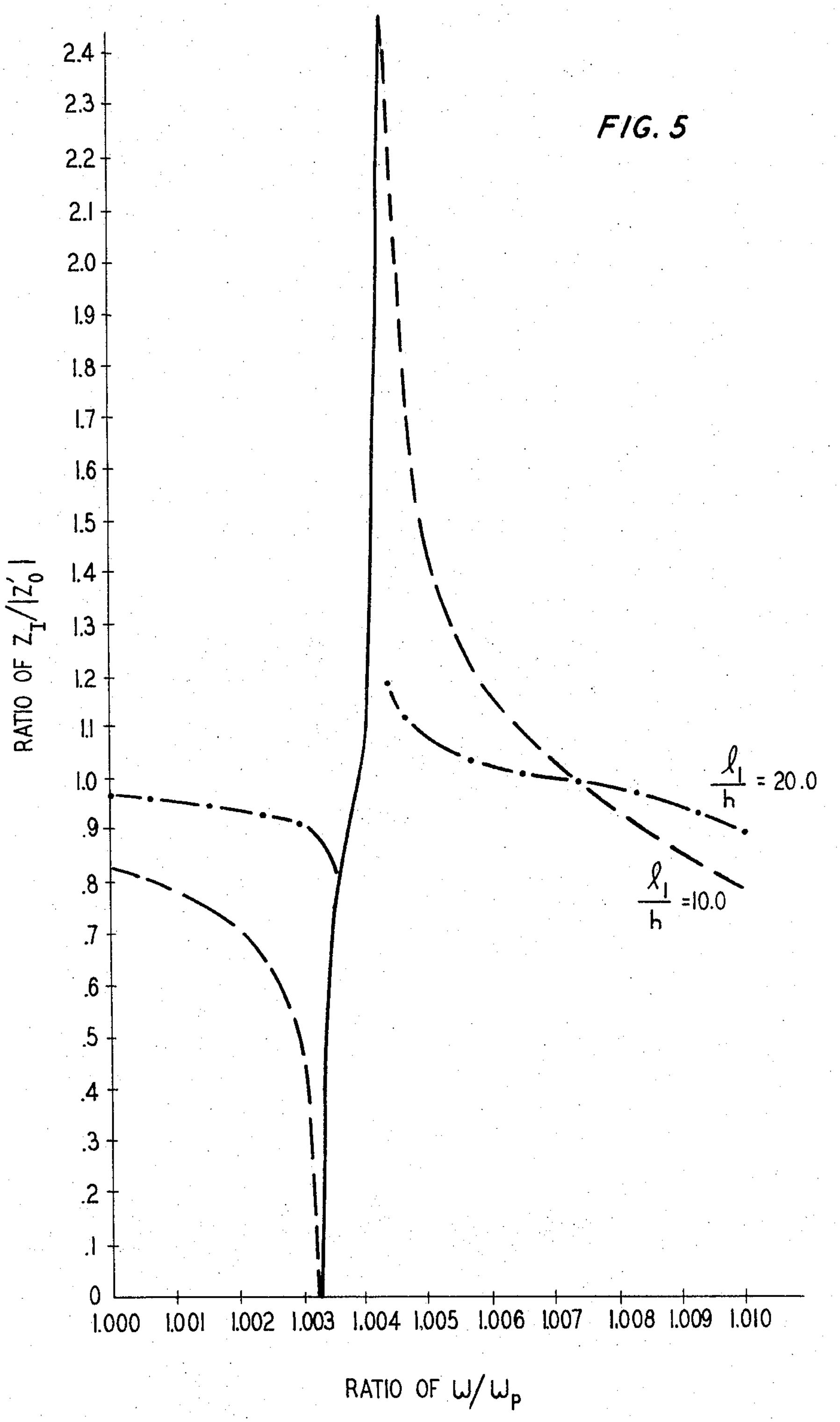
FIG. 5 is a plot of characteristic impedances of a thickness-twist filter plotted as a function of $\omega/\omega_p$.

The value of $Z_I$, which is of particular interest in the designing of a thickness-twist filter for the elimination of energy loss in the shorting tabs in accordance with the invention, may be calculated for the condition where $l_2/h = 25.0$ and $l_1/h = 10$, which is the range indicated in the calculations above. In the passband, the characteristic impedance is a zero at the lower cutoff, infinity at the upper cutoff and a resistance equal to about 0.9 times the absolute value of $Z_o$ at the midband. Outside of the passband, the term in the square root of the $Z_l$ portion of equation (23) is always positive and the characteristic impedance is a positive reactance. Some values over the complete frequency range of the trapped energy region are shown in FIG. 5. The dashed curve shows the impedance for $l_1/h = 10.0$. On the low side of the filter band, the impedance is less than $Z_o'$, while above the passband up to a ratio of $\omega/\omega_c = 1.0074$ the value is higher. As the second trapped energy region is approached, the impedance tends again to values less that $Z_o'$. If the ratio $l_1/h$ is made larger, the passband becomes lower and the characteristic impedance outside the band approaches more closely to $Z_o'$, the characteristic impedance of the nonpropagating mode. The dot-dash line shows the result for $l_1/h = 20$.

As indicated above in the discussion of FIG. 2, a straight crested shear wave cannot extend up to the edge of the plated section and then vanish outside this region. Instead, the motion in the plated section is a combination of a straight crested shear wave plus a thickness-twist mode, and it is this latter mode which is propagated at right angles to the direction of the shear displacement. If the crystal were bare on both sides, then, since it would be in a nonpropagating mode, it would not carry any energy away so long as the boundary were sufficiently far away. The introduction of a short-circuiting tab, however, appears to offset this condition which creates the need which is met by the principles of the invention.

The result of constructing the short-circuiting tabs in accordance with the invention is, as illustrated by the solid line in FIG. 5, to introduce a thickness-twist impedance approximately equal to the $Z_o'$, the impedance of the infinite section; and it is this condition which is responsible for blocking the loss of energy in the short-circuiting tab. The particular structure employed for a short-circuiting tab in accordance with the invention is illustrated in FIG. 6 and in FIG. 7. The two tabs shown in FIG. 6 correspond to the conventional tabs 106A and 107A of FIG. 1. Additionally, the two A blocks in FIG. 6 correspond to electrodes 106 and 107 in FIG. 1, namely, two of the intermediate electrodes. Electrodes corresponding to A in each case are in alignment on the outside of the crystal wafer. The dashed lines in FIG. 6 indicate that in each case the blocks C, B and C on the underside of the crystal are placed on the opposite edge from those corresponding blocks shown on the top side. This aspect of the structure is shown clearly by FIG. 7. From the structure shown by FIGS. 6 and 7 it is evident that the shorting path for the A electrodes remains incomplete. In initial fabrication, it is desirable to leave the shorting path open until actual installation so that final testing and adjustment of each resonator may be accomplished while it is in an open circuit condition. When the filter is actually installed for operation, however, an additional conducting path 70, as shown in FIG. 7, is provided between the edge blocks C and C'.

As indicated in FIG. 6, the shorting tabs are located on alternate edges or sides of the filter in order to reduce coupling between adjacent tabs. A basic requirement for the tab filter is that its passband must be different from that of the principal or thickness shear filter. For the same $R$ ratio, the thickness-twist filter will have the lower frequency because of the larger value of $k$, which is 1.02 for the thickness twist and 0.914 for the shear filter. This difference can be enhanced advantageously by making the B electrode thicker than the shear electrode A. The connecting electrode C in each case can be made of relatively thin film since the only requirement is that the short-circuiting resistance shall be much lower than the reactance of the A electrodes. The material for the electrodes is metallic and may advantageously be gold, a chromium gold alloy, silver, aluminum or various other suitable highly conductive materials. Typical thicknesses for the electrodes are 1,000 to 3,000 angstroms for the A electrodes, approximately double that thickness for the B electrodes, and approximately 100 angstroms for the C electrodes.

If the ratio of the $R$ of the masses in the thin part is in the order of $R_1 = 0.005$, while that in the B plates is $R_2 = 0.035$, the passband of the thickness-twist filter will be determined by the ratio $\omega_c/\omega_p = (1+R_2/1+R_1)$ with $$\omega_p = \frac{\pi}{2h\ (1+R_2)} \sqrt{\frac{c_{66}{}^E}{\rho}}.$$

The center of the passband lies approximately at $\omega = 1.0038\omega_{pT}$. . If R for the thickness shear filter is 0.02, the center of the passband for this filter is $1.0045\omega_p$ . The ratio of $\omega_{pS}/\omega_{pT}$ is $(1.0025/1,002) = 1.0005$. Hence the narrow passband of the thickness-twist filter is $\omega_{cT}/\omega_{cS} = 1.0012$, which is six times the half-width of the passband of a particular commercial channel filter. At this frequency, the amount of shear wave energy is negligible and as a result, it is found that no energy is lost from the tabs.

It is to be understood that the embodiment described herein is merely illustrative of the principles of the invention. Various modifications thereto may be effected by persons skilled in the art without departing from the spirit and scope of the invention.

What is claimed is:

1. A monolithic crystal filter comprising, in combination,
a piezoelectric crystal body member sandwiched between at least three spaced electrode pairs,
means shorting a first one of said pairs,
said shorting means comprising an auxiliary filter tuned to a passband having a center frequency that differs from the center frequency of the passband of said monolithic crystal filter,
said auxiliary filter including an auxiliary pair of electrodes sandwiching said body member to form an auxiliary monolithic crystal filter,
said auxiliary pair of electrodes being mass loaded to reflect energy back into the trapped energy zone of the resonator formed by said first one of said pairs,
whereby energy dissipation in said shorting means is avoided and overall filter efficiency is enhanced.

2. Apparatus in accordance with claim 1 wherein said monolithic crystal filter is of the thickness-shear type and wherein said auxiliary filter is of the thickness-twist type.

3. Apparatus in accordance with claim 1 wherein the electrodes of said first pair are in substantial alignment on opposite sides of said body,
said auxiliary pair of electrodes being non-aligned, one positioned between one of said first pair and one boundary of said body and the other between the other of said first pair and an opposite boundary of said body,
said shorting means including first thin film conducting means connecting each of said first pair of electrodes to the adjacent one of said auxiliary pair of electrodes and second thin film conducting means extending between each of said auxiliary pair of electrodes and the adjacent one of said boundaries,
said shorting means further including first means connecting said second thin film conducting means to each other.

4. Apparatus in accordance with claim 3 wherein said auxiliary electrodes are substantially thicker than said first one of said pairs.

5. Apparatus in accordance with claim 3 including means connecting said first connecting means to a reference potential.

6. A monolithic crystal filter comprising, in combination,
a piezoelectric crystal body member sandwiched between input and output electrode pairs and between a plurality of intermediate electrode pairs,
respective means shorting each of said intermediate electrode pairs,
each of said respective shorting means comprising a respective auxiliary filter tuned to a passband having a center frequency that differs from the center frequency of the passband of said monolithic crystal filter, each of said auxiliary filters including a respective auxiliary pair of electrodes sandwiching said body member to form a respective auxiliary monolithic crystal filter, each of said auxiliary pair of electrodes being mass loaded to reflect energy back into the trapped energy zone of the resonator formed by the corresponding one of said plurality of intermediate electrode pairs, whereby energy dissipation is avoided and overall filter efficiency is enhanced.

7. Apparatus in accordance with claim 6 wherein each of said auxiliary filters comprises a composite of different mass loaded regions each in conductive contact with at least one adjacent one of said regions and each of the electrodes of said intermediate pairs being in conductive contact with a respective one of said regions.

8. Apparatus in accordance with claim 7 wherein each composite of said regions comprises first and second auxiliary electrodes each spaced between a respective one of the electrodes of one of said intermediate electrode pairs and a respective boundary portion of said crystal body, first conducting means connecting each of said auxiliary electrodes to a corresponding one of said intermediate electrodes, second conducting means between each of said auxiliary electrodes and a respective one of said boundary portions, and third conducting means connecting said second conducting means.

9. Apparatus in accordance with claim 8 wherein said first and second conducting means comprises thin film portions exceeded substantially in thickness by said electrodes.

10. Apparatus in accordance with claim 9 wherein the thickness of said auxiliary electrodes exceeds the thickness of said intermediate electrode pairs.

* * * * *